US012620526B2

(12) United States Patent
Ishima et al.

(10) Patent No.: US 12,620,526 B2
(45) Date of Patent: May 5, 2026

(54) METHOD FOR MANUFACTURING MULTILAYER COIL COMPONENT

(71) Applicant: TDK CORPORATION, Tokyo (JP)

(72) Inventors: Yuya Ishima, Tokyo (JP); Kosuke Ito, Tokyo (JP); Shinichi Kondo, Tokyo (JP); Shingo Hattori, Tokyo (JP); Hidenobu Umeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1095 days.

(21) Appl. No.: 17/687,940

(22) Filed: Mar. 7, 2022

(65) Prior Publication Data

US 2022/0293332 A1 Sep. 15, 2022

(30) Foreign Application Priority Data

Mar. 9, 2021 (JP) ................................ 2021-037463

(51) Int. Cl.

| | |
|---|---|
| ***H01F 41/04*** | (2006.01) |
| ***H01F 27/29*** | (2006.01) |
| ***H01F 27/32*** | (2006.01) |

(52) U.S. Cl.

CPC ......... *H01F 41/046* (2013.01); *H01F 27/292* (2013.01); *H01F 27/327* (2013.01); *H01F 41/041* (2013.01)

(58) Field of Classification Search

CPC .... H01F 41/043; H01F 41/046; H01F 41/041; H01F 41/042; H01F 17/0006; H01F 17/0013

See application file for complete search history.

(56) References Cited

U.S. PATENT DOCUMENTS

| | | | | |
|---|---|---|---|---|
| 2019/0244750 | A1 | 8/2019 | Suzuki et al. | |
| 2019/0311842 | A1 | 10/2019 | Imada et al. | |
| 2020/0373063 | A1 * | 11/2020 | Yoshinaka .......... | H01F 27/2804 |

FOREIGN PATENT DOCUMENTS

| | | | | | |
|---|---|---|---|---|---|
| JP | 11204361 | A * | 7/1999 | ......... | H01F 17/0013 |
| JP | 2005-123509 | A | 5/2005 | | |
| JP | 2019-140148 | A | 8/2019 | | |
| JP | 2019-186525 | A | 10/2019 | | |
| JP | 2022137791 | A * | 9/2022 | ........... | H01F 41/125 |

* cited by examiner

*Primary Examiner* — Livius R. Cazan

(74) *Attorney, Agent, or Firm* — Oliff PLC

(57) ABSTRACT

A method for manufacturing a multilayer coil component 1 includes: a step of forming a conductor by a photolithography method using photosensitive conductive paste; a step of forming an insulating film covering the conductor by a photolithography method using photosensitive insulating paste; a step of forming a resin layer holding the conductor covered with the insulating film by a positive-type photoresist; a step of forming a plurality of the conductors and the insulating film and then removing the resin layer by irradiating the resin layer with ultraviolet rays and developing the resin layer; and a step of filling the conductor covered with the insulating film with a magnetic material after removing the resin layer.

4 Claims, 10 Drawing Sheets

METHOD FOR MANUFACTURING MULTILAYER COIL COMPONENT

TECHNICAL FIELD

The present invention relates to a method for manufacturing a multilayer coil component.

BACKGROUND

The method described in, for example, Patent Literature 1 (Japanese Unexamined Patent Publication No. 2019-186525) is known as a multilayer coil component manufacturing method of the related art. The method described in Patent Literature 1 is to manufacture a coil component that has an element body containing a filler and a resin material, a coil portion configured from a coil conductor embedded in the element body, and a pair of external electrodes electrically connected to the coil conductor covered with a glass film. The method includes a step of forming a conductor paste layer with photosensitive metal paste containing a metal constituting a coil conductor on a substrate by a photolithography method, a step of forming a glass paste layer so as to cover the conductor paste layer with photosensitive glass paste containing glass constituting a glass film by a photolithography method, a step of forming a holding layer with photosensitive paste removable after firing in a region on the substrate lacking the conductor paste layer and the glass paste layer, and a step of forming the coil portion on the substrate by firing the substrate where the conductor paste layer, the glass paste layer, and the holding layer are formed.

SUMMARY

In the method for manufacturing a multilayer coil component of the related art, the glass film covering the coil conductor and the coil is formed and the holding layer disappears by the substrate being fired with the conductor paste layer, the glass paste layer, and the holding layer formed. However, when the holding layer disappears as a result of the firing in the method of the related art, the coil conductor held by the holding layer may deviate or the posture of the coil conductor may collapse by being affected by binder removal of the photosensitive paste forming the holding layer or the like. In a case where the coil conductor is problematic as described above, the reliability of the multilayer coil component may decline or a decline in yield may arise.

One aspect of the present invention is to provide a method for manufacturing a multilayer coil component by which a coil conductor becoming problematic in a manufacturing process can be suppressed.

A method for manufacturing a multilayer coil component according to one aspect of the present invention is a method for manufacturing a multilayer coil component including an element body and a coil disposed in the element body and configured to include a plurality of conductors. The method includes: a step of forming the conductor by a photolithography method using photosensitive conductive paste; a step of forming an insulating film covering the conductor by a photolithography method using photosensitive insulating paste; a step of forming a resin layer holding the conductor covered with the insulating film by a positive-type photoresist; a step of, after forming the conductor and the insulating film, irradiating the resin layer with ultraviolet rays and developing the resin layer to remove the resin layer; and a step of filling the conductor covered with the insulating film with a magnetic material after removing the resin layer.

In the method for manufacturing the multilayer coil component according to one aspect of the present invention, the resin layer is formed by a positive-type photoresist, the resin layer is irradiated with ultraviolet rays and developed, and the resin layer is removed. In this manner, the resin layer can be removed without firing by the method for manufacturing the multilayer coil component. Accordingly, by the method for manufacturing the multilayer coil component, it is possible to suppress the coil conductor becoming problematic in the manufacturing process due to binder removal during firing or the like. As a result, by the method for manufacturing the multilayer coil component, a decline in the reliability of the multilayer coil component and a decline in yield can be avoided.

In one embodiment, the photosensitive insulating paste may be photosensitive glass paste and a glass film may be formed as the insulating film. By this method, the adjacent coil conductors can be electrically insulated from each other appropriately.

In one embodiment, the method may include a step of performing heat treatment on the conductor and the insulating film after removing the resin layer. In this method, filling with the magnetic material is performed after the conductor and the insulating film are sintered by heat treatment, and thus it is possible to further suppress the conductor becoming problematic.

In one embodiment, the method may include a step of performing heat treatment after filling the conductor with the magnetic material. In this method, heat treatment is performed after the conductor is filled with the magnetic material after resin layer removal, and thus the conductor is held by the magnetic material. Accordingly, conductor deviation can be further suppressed.

According to one aspect of the present invention, it is possible to suppress the coil conductor becoming problematic in the manufacturing process.

DETAILED DESCRIPTION

Figure 1:
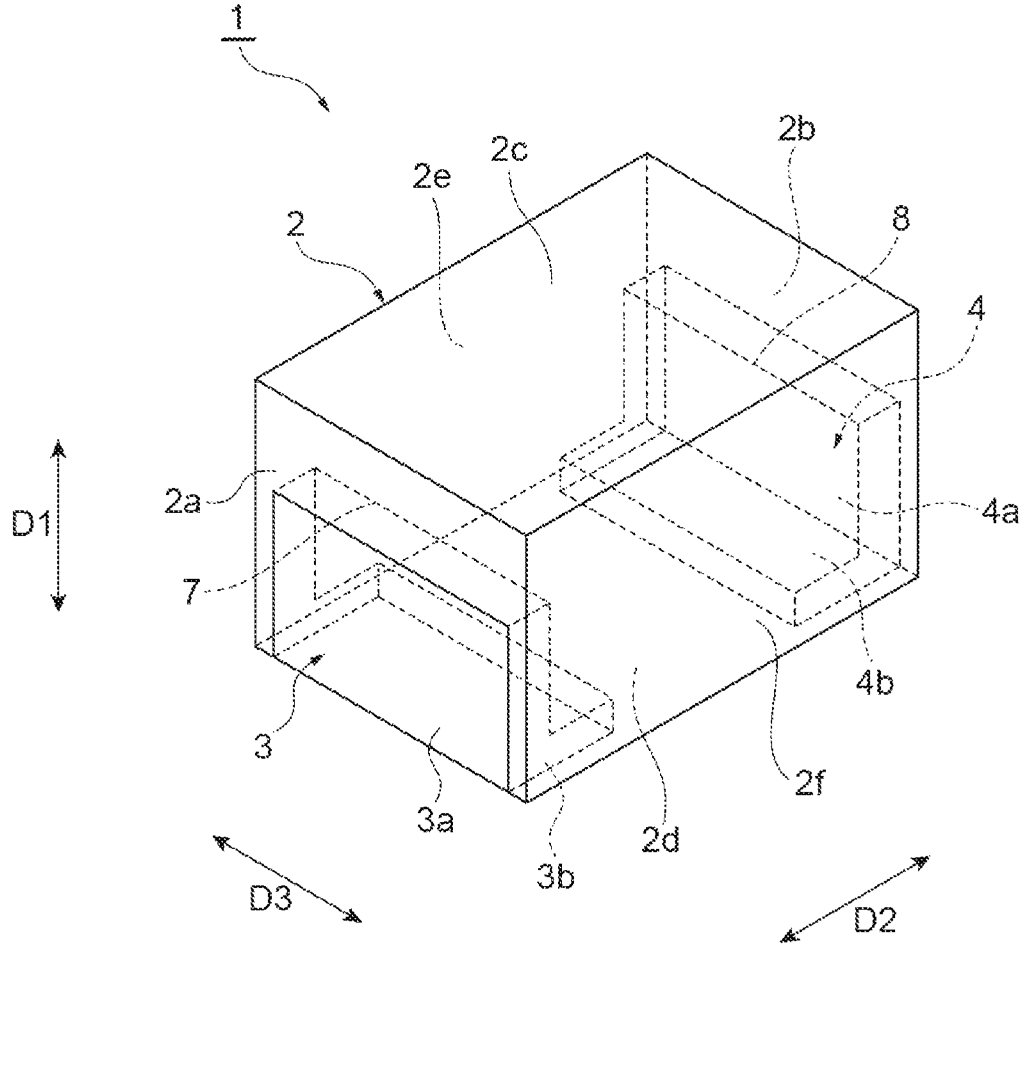
FIG. 1 is a perspective view of a multilayer coil component according to a first embodiment.

Hereinafter, preferred embodiments of the present invention will be described in detail with reference to the accompanying drawings. In the description of the drawings, the same or equivalent elements are denoted by the same reference numerals with redundant description omitted.

First Embodiment

Figure 2:
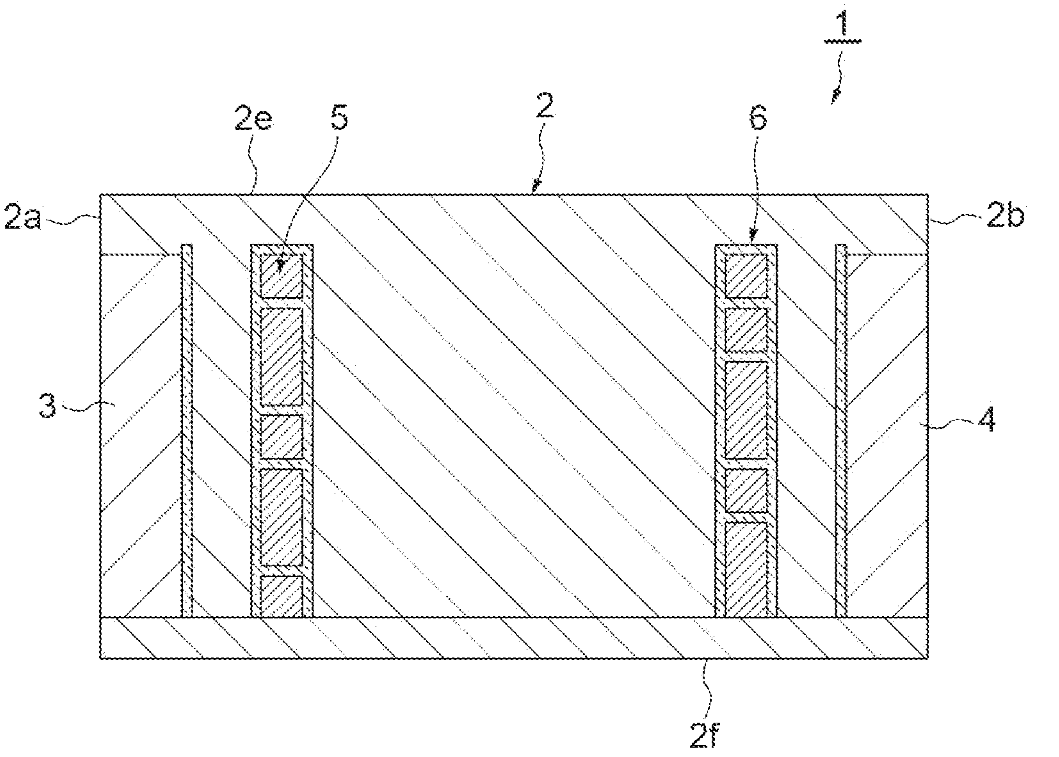
FIG. 2 is a diagram illustrating a cross-sectional configuration of the multilayer coil component illustrated in FIG. 1.

A multilayer coil component according to a first embodiment will be described with reference to FIGS. 1 and 2. FIG. 1 is a perspective view of the multilayer coil component according to the first embodiment. FIG. 2 is a diagram illustrating a cross-sectional configuration of the multilayer coil component illustrated in FIG. 1. As illustrated in FIGS. 1 and 2, a multilayer coil component 1 includes an element body 2, a first terminal electrode 3, a second terminal electrode 4, a coil 5, and a covering portion 6.

The element body 2 has a rectangular parallelepiped shape. The rectangular parallelepiped shape includes a rectangular parallelepiped shape in which the corner and ridge portions are chamfered and a rectangular parallelepiped shape in which the corner and ridge portions are rounded. The element body 2 has end surfaces 2*a* and 2*b*, main surfaces 2*c* and 2*d*, and side surfaces 2*e* and 2*f* as outer surfaces. The end surfaces 2*a* and 2*b* face each other. The main surfaces 2*c* and 2*d* face each other. The side surfaces 2*e* and 2*f* face each other. In the following description, the direction in which the main surfaces 2*c* and 2*d* face each other is a first direction D1, the direction in which the end surfaces 2*a* and 2*b* face each other is a second direction D2, and the direction in which the side surfaces 2*e* and 2*f* face each other is a third direction D3. The first direction D1, the second direction D2, and the third direction D3 are substantially orthogonal to each other.

The end surfaces 2*a* and 2*b* extend in the first direction D1 so as to connect the main surfaces 2*c* and 2*d*. The end surfaces 2*a* and 2*b* also extend in the third direction D3 so as to connect the side surfaces 2*e* and 2*f*. The main surfaces 2*c* and 2*d* extend in the second direction D2 so as to connect the end surfaces 2*a* and 2*b*. The main surfaces 2*c* and 2*d* also extend in the third direction D3 so as to connect the side surfaces 2*e* and 2*f*. The side surfaces 2*e* and 2*f* extend in the first direction D1 so as to connect the main surfaces 2*c* and 2*d*. The side surfaces 2*e* and 2*f* also extend in the second direction D2 so as to connect the end surfaces 2*a* and 2*b*.

The main surface 2*d* is a mounting surface. The main surface 2*d* faces another electronic device (not illustrated) when, for example, the multilayer coil component 1 is mounted on the electronic device (such as a circuit base material and a multilayer electronic component). The end surfaces 2*a* and 2*b* are continuous from the mounting surface (that is, the main surface 2*d*).

In the present embodiment, the length of the element body 2 in the second direction D2 is longer than the length of the element body 2 in the third direction D3 and the length of the element body 2 in the first direction D1. The length of the element body 2 in the third direction D3 and the length of the element body 2 in the first direction D1 are, for example, equivalent to each other. In other words, in the present embodiment, the end surfaces 2*a* and 2*b* have a square shape and the main surfaces 2*c* and 2*d* and the side surfaces 2*e* and 2*f* have a rectangular shape. The length of the element body 2 in the second direction D2 may be equivalent to or shorter than the length of the element body 2 in the third direction D3 and the length of the element body 2 in the first direction D1. The length of the element body 2 in the third direction D3 and the length of the element body 2 in the first direction D1 may be different from each other.

It should be noted that "equivalent" in the present embodiment may mean not only "equal" but also a value including a slight difference, a manufacturing error, or the like in a preset range. For example, it is defined that a plurality of values are equivalent insofar as the plurality of values are included in the range of 95% to 105% of the average value of the plurality of values.

The outer surface of the element body 2 is provided with a first recessed portion 7 and a second recessed portion 8. Specifically, the first recessed portion 7 is provided in the end surface 2*a* and is recessed toward the end surface 2*b*. The second recessed portion 8 is provided in the end surface 2*b* and is recessed toward the end surface 2*a*.

The element body 2 is made of, for example, a magnetic material (Ni—Cu—Zn-based ferrite material, Ni—Cu—Zn—Mg-based ferrite material, Ni—Cu-based ferrite material, or the like). The magnetic material constituting the element body 2 may contain a Fe alloy or the like.

The first terminal electrode 3 is disposed on the end surface 2*a* side of the element body 2. The second terminal electrode 4 is disposed on the end surface 2*b* side of the element body 2. The first terminal electrode 3 and the second terminal electrode 4 are separated from each other in the second direction D2. The first terminal electrode 3 is disposed in the first recessed portion 7. The second terminal electrode 4 is disposed in the second recessed portion 8. The first terminal electrode 3 is disposed over the end surface 2*a* and the main surface 2*d*. The second terminal electrode 4 is disposed over the end surface 2*b* and the main surface 2*d*. In the present embodiment, the surface of the first terminal electrode 3 is substantially flush with each of the end surface 2*a* and the main surface 2*d*. The surface of the second terminal electrode 4 is substantially flush with each of the end surface 2*b* and the main surface 2*d*. The first terminal electrode 3 and the second terminal electrode 4 are made of a conductive material (for example, Ag and/or Pd).

The first terminal electrode 3 has an L shape when viewed from the third direction D3. The first terminal electrode 3 has a plurality of electrode parts 3*a* and 3*b*. The electrode part 3*a* and the electrode part 3*b* are connected in the ridge portion of the element body 2 and are electrically connected to each other. In the present embodiment, the electrode part 3*a* and the electrode part 3*b* are integrally formed. The electrode part 3*a* extends along the first direction D1. The electrode part 3*a* has a rectangular shape when viewed from the second direction D2. The electrode part 3*b* extends along the second direction D2. The electrode part 3*b* has a rectangular shape when viewed from the first direction D1. The electrode parts 3*a* and 3*b* extend along the third direction D3.

The first terminal electrode 3 is formed by laminating a plurality of first electrode layers 20, 21, 22, 23, 24, 25, and 26 (see FIG. 5E) in the first direction D1. In other words, the lamination direction of the first electrode layers 20 to 26 is the first direction D1. In the actual first terminal electrode 3, the plurality of first electrode layers 20 to 26 are integrated to the extent that the boundaries between the layers cannot be visually recognized.

The second terminal electrode 4 has an L shape when viewed from the third direction D3. The second terminal electrode 4 has a plurality of electrode parts 4*a* and 4*b*. The electrode part 4*a* and the electrode part 4*b* are connected in the ridge portion of the element body 2 and are electrically connected to each other. In the present embodiment, the electrode part 4*a* and the electrode part 4*b* are integrally formed. The electrode part 4*a* extends along the first direction D1. The electrode part 4*a* has a rectangular shape when viewed from the second direction D2. The electrode part 4*b* extends along the second direction D2. The electrode part 4*b* has a rectangular shape when viewed from the first direction D1. The electrode parts 4*a* and 4*b* extend along the third direction D3.

The second terminal electrode 4 is formed by laminating a plurality of second electrode layers 30, 31, 32, 33, 34, 35, and 36 (see FIG. 5E) in the first direction D1. In other words, the lamination direction of the second electrode layers 30 to 36 is the first direction D1. In the actual second terminal electrode 4, the plurality of second electrode layers 30 to 36 are integrated to the extent that the boundaries between the layers cannot be visually recognized.

The first terminal electrode 3 and the second terminal electrode 4 may be provided with a plating layer (not illustrated) containing, for example, Ni, Sn, Au, or the like by electrolytic plating or electroless plating. The plating layer may have, for example, a Ni plating film containing Ni and covering the first terminal electrode 3 and the second terminal electrode 4 and an Au plating film containing Au and covering the Ni plating film.

The coil 5 is disposed in the element body 2. One end of the coil 5 is connected to the first terminal electrode 3 by a connecting conductor 48. The other end of the coil 5 is connected to the second terminal electrode 4 by a connecting conductor 49. The coil 5 is configured to include a plurality of coil conductors 40, 41, 42, 43, 44, 45, and 46 (see FIG. 5E). The plurality of coil conductors 40 to 46 are interconnected to constitute the coil 5. The coil axis of the coil 5 is provided along the first direction D1. The coil conductors 40 to 46 are disposed so as to overlap at least in part when viewed from the first direction D1. The coil conductors 40 to 46 are disposed apart from the end surfaces 2*a* and 2*b*, the main surfaces 2*c* and 2*d*, and the side surfaces 2*e* and 2*f*. The coil 5 is made of a conductive material (for example, Ag and/or Pd).

The covering portion 6 covers the coil 5. The covering portion 6 is configured to include glass films (insulating films) 60, 61, 62, 63, 64, 65, and 66 (see FIG. 5E). The covering portion 6 is made of glass.

An example of a method for manufacturing the multilayer coil component 1 will be described below with reference to FIGS. 3A to 3F, 4A to 4F, and 5A to 5F. FIGS. 3A to 3F, 4A to 4F, and 5A to 5F illustrate plan and/or cross-sectional views in the manufacturing process. In the present embodiment, the multilayer coil component 1 is manufactured by a photolithography method. The "photolithography method" of the present embodiment may be any by which a layer that contains a photosensitive material and is to be processed is processed into a desired pattern by exposure and development and is not limited to mask types and so on.

Figure 3A:
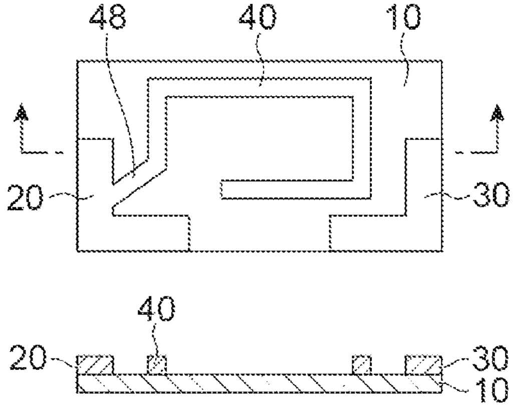
FIGS. 3A, 3B, 3C, 3D, 3E, and 3F are views illustrating a multilayer coil component manufacturing process.

As illustrated in FIG. 3A, the first electrode layer 20, the second electrode layer 30, the coil conductor 40, and the connecting conductor 48 are formed on a magnetic material substrate 10. The first electrode layer 20, the second electrode layer 30, the coil conductor 40, and the connecting conductor 48 are formed by a photolithography method. Specifically, photosensitive silver paste (photosensitive conductive paste) is applied onto the magnetic material substrate 10. Subsequently, the photosensitive silver paste is exposed by being irradiated with ultraviolet rays via a mask (such as a Cr mask) having the pattern of the first electrode layer 20, the second electrode layer 30, the coil conductor 40, and the connecting conductor 48 and developed with a developing solution. The first electrode layer 20, the second electrode layer 30, the coil conductor 40, and the connecting conductor 48 are formed as a result. The first electrode layer 20 and the coil conductor 40 are electrically connected by the connecting conductor 48. The first electrode layers 21 to 26, the second electrode layers 31 to 36, the coil conductors 41 to 46, and the connecting conductor 49 are formed by the same method as the photolithography method described above.

Figure 3B:
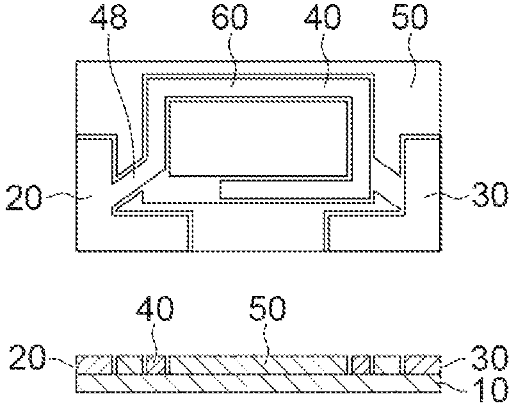

Next, a holding layer (resin layer) 50 is formed as illustrated in FIG. 3B. The holding layer 50 holds the coil conductor 40. The holding layer 50 is a positive-type photoresist. The holding layer 50 is formed by a photolithography method. Specifically, resin paste forming a positive-type photoresist is applied onto the magnetic material substrate 10, the first electrode layer 20, the second electrode layer 30, the coil conductor 40, and the connecting conductor 48. Subsequently, the resin paste is exposed by being irradiated with ultraviolet rays via a mask having the pattern of the first electrode layer 20, the second electrode layer 30, the coil conductor 40, and the connecting conductor 48 and developed with a developing solution. The holding layer 50 is formed as a result. The mask has a pattern wider than the first electrode layer 20, the second electrode layer 30, the coil conductor 40, and the connecting conductor 48 such that a gap is formed between the first electrode layer 20, the second electrode layer 30, the coil conductor 40, and the connecting conductor 48 and the holding layer 50. Holding layers 51 to 56 are formed by the same method as the photolithography method described above.

Figure 3C:
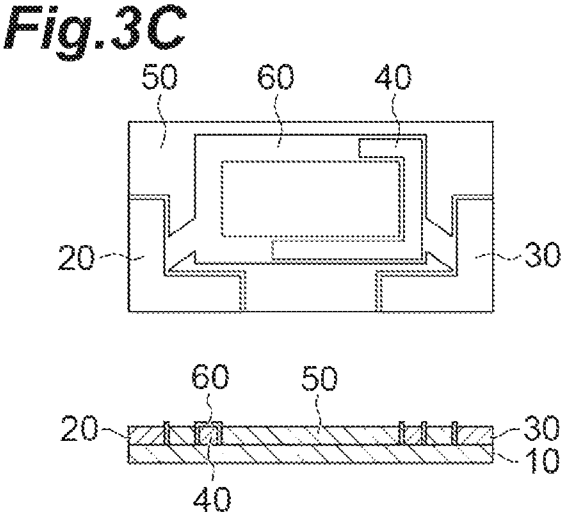

Next, the glass film (insulating layer) 60 is formed as illustrated in FIG. 3C. The glass film 60 is formed by a photolithography method. Specifically, photosensitive glass paste is applied onto the first electrode layer 20, the second electrode layer 30, the coil conductor 40, the connecting conductor 48, and the holding layer 50. As a result, the gap between the first electrode layer 20, the second electrode layer 30, the coil conductor 40, and the connecting conductor 48 and the holding layer 50 is filled with the photosensitive glass paste. Subsequently, the photosensitive glass paste is exposed by being irradiated with ultraviolet rays via a mask exposing a part of the first electrode layer 20, the second electrode layer 30, and the coil conductor 40 and developed with a developing solution. The glass film 60 is formed as a result. The glass film 60 exposes a part of the first electrode layer 20, the second electrode layer 30, and the coil conductor 40. The glass film 60 covers the coil conductor 40. Specifically, the glass film 60 covers the side surface and the upper surface of the coil conductor 40 and exposes a part of the upper surface. The glass films 61 to 66 are formed by the same method as the photolithography method described above.

Figure 3D:
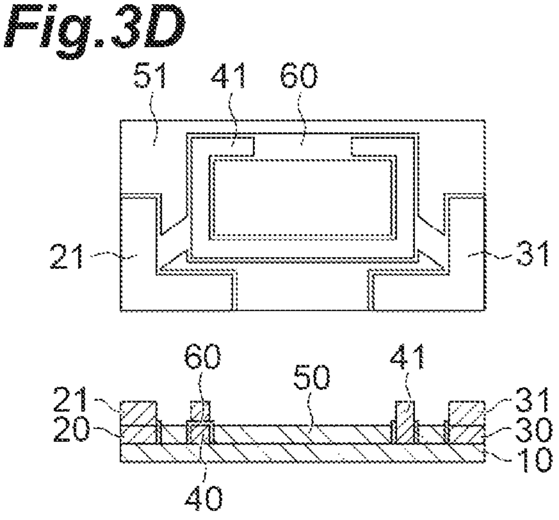
Figure 3E:
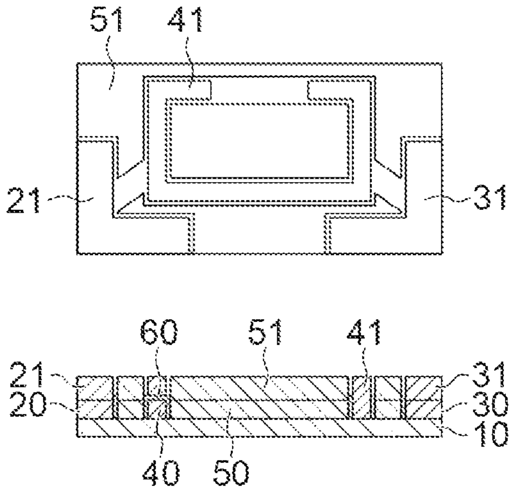
Figure 3F:
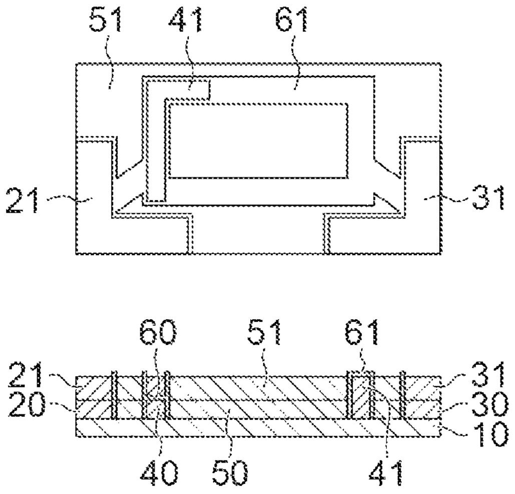

Next, the first electrode layer 21, the second electrode layer 31, and the coil conductor 41 are formed as illustrated in FIG. 3D. The first electrode layer 21 is formed on the first electrode layer 20. The first electrode layer 21 is electrically connected to the first electrode layer 20. The second electrode layer 31 is formed on the second electrode layer 30. The second electrode layer 31 is electrically connected to the second electrode layer 32. The coil conductor 41 is formed on a part of the coil conductor 40. The coil conductor 41 is electrically connected to the coil conductor 40. Next, the holding layer 51 is formed as illustrated in FIG. 3E. The holding layer 51 is formed on the holding layer 50. Next, the glass film 61 is formed as illustrated in FIG. 3F. The glass film 61 exposes a part of the first electrode layer 21, the second electrode layer 31, and the coil conductor 41.

Figure 4A:
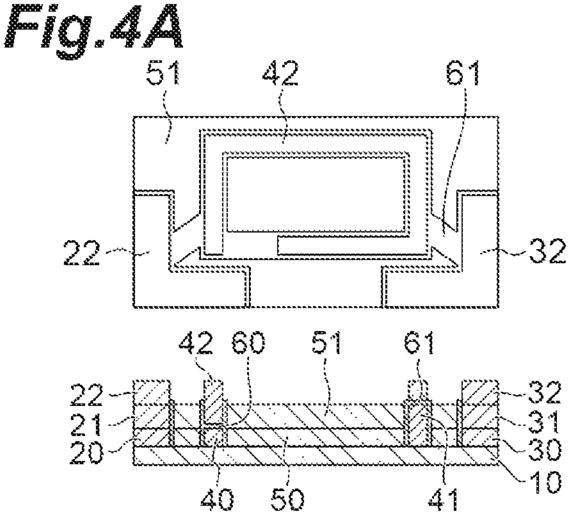
FIGS. 4A, 4B, 4C, 4D, 4E, and 4F are views illustrating the multilayer coil component manufacturing process.
Figure 4B:
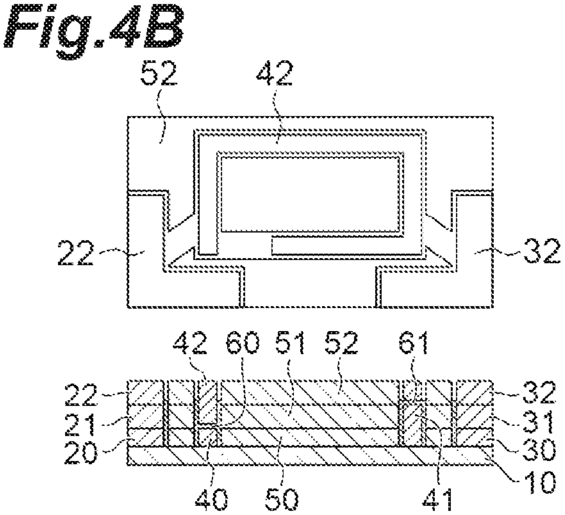
Figure 4C:
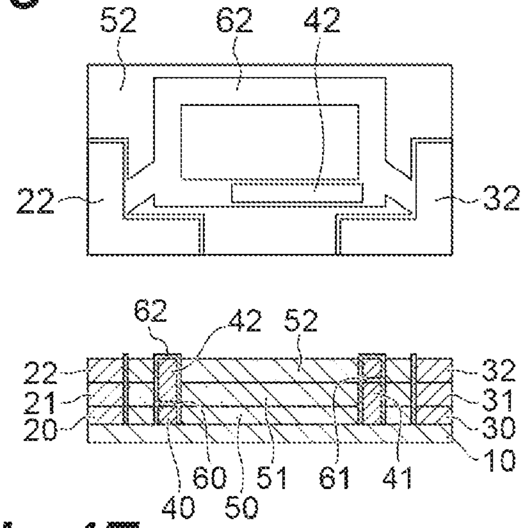

Next, the first electrode layer 22, the second electrode layer 32, and the coil conductor 42 are formed as illustrated in FIG. 4A. The first electrode layer 22 is formed on the first electrode layer 21. The first electrode layer 22 is electrically connected to the first electrode layer 21. The second electrode layer 32 is formed on the second electrode layer 31. The second electrode layer 32 is electrically connected to the second electrode layer 31. The coil conductor 42 is formed on a part of the coil conductor 41. The coil conductor 42 is electrically connected to the coil conductor 41. Next, the holding layer 52 is formed as illustrated in FIG. 4B. The holding layer 52 is formed on the holding layer 51. Next, the glass film 62 is formed as illustrated in FIG. 4C. The glass film 62 exposes a part of the first electrode layer 22, the second electrode layer 32, and the coil conductor 42.

Figure 4D:
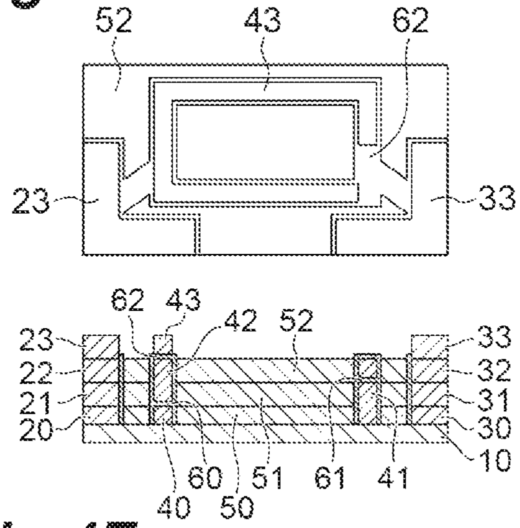
Figure 4E:
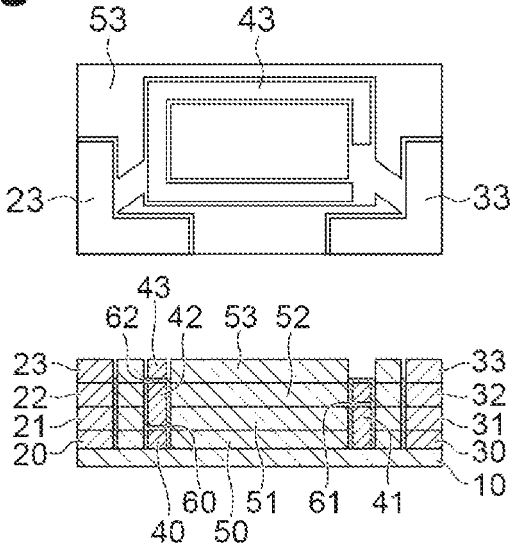
Figure 4F:
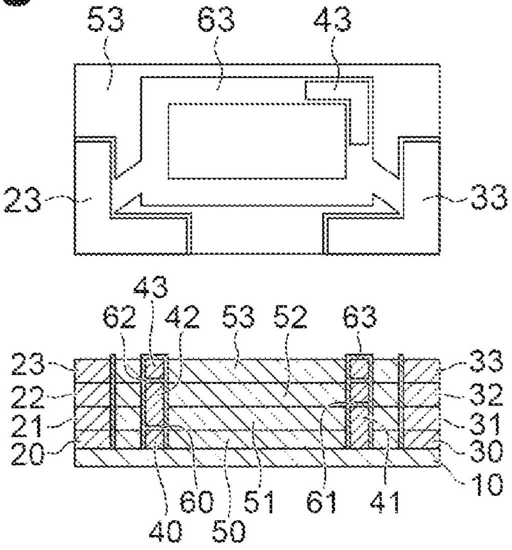

Next, the first electrode layer 23, the second electrode layer 33, and the coil conductor 43 are formed as illustrated in FIG. 4D. The first electrode layer 23 is formed on the first electrode layer 22. The first electrode layer 23 is electrically connected to the first electrode layer 22. The second electrode layer 33 is formed on the second electrode layer 32. The second electrode layer 33 is electrically connected to the second electrode layer 32. The coil conductor 43 is formed on a part of the coil conductor 42. The coil conductor 43 is electrically connected to the coil conductor 42. Next, the holding layer 53 is formed as illustrated in FIG. 4E. The holding layer 53 is formed on the holding layer 52. Next, the glass film 63 is formed as illustrated in FIG. 4F. The glass film 63 exposes a part of the first electrode layer 23, the second electrode layer 33, and the coil conductor 43.

Figure 5A:
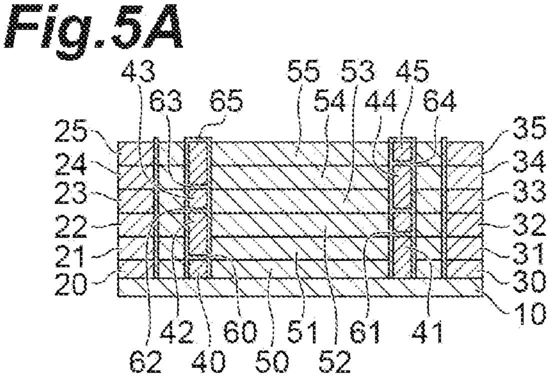
FIGS. 5A, 5B, 5C, 5D, 5E, and 5F are views illustrating the multilayer coil component manufacturing process.

Next, the first electrode layer 24 and the first electrode layer 25 are formed as illustrated in FIG. 5A. The first electrode layer 24 is formed on the first electrode layer 23. The first electrode layer 25 is formed on the first electrode layer 24. In addition, the second electrode layer 34 and the second electrode layer 35 are formed. The second electrode layer 34 is formed on the second electrode layer 33. The second electrode layer 35 is formed on the second electrode layer 34.

In addition, the coil conductor 44 and the coil conductor 45 are formed. The coil conductor 44 is formed on a part of the coil conductor 43. The coil conductor 45 is formed on a part of the coil conductor 44.

In addition, the holding layer 54 and the holding layer 55 are formed. The holding layer 54 is formed on the holding layer 53. The holding layer 55 is formed on the holding layer 54. In addition, the glass film 64 and the glass film 65 are formed. The glass film 64 is formed on the glass film 63. The glass film 65 is formed on the glass film 64.

Figure 5B:
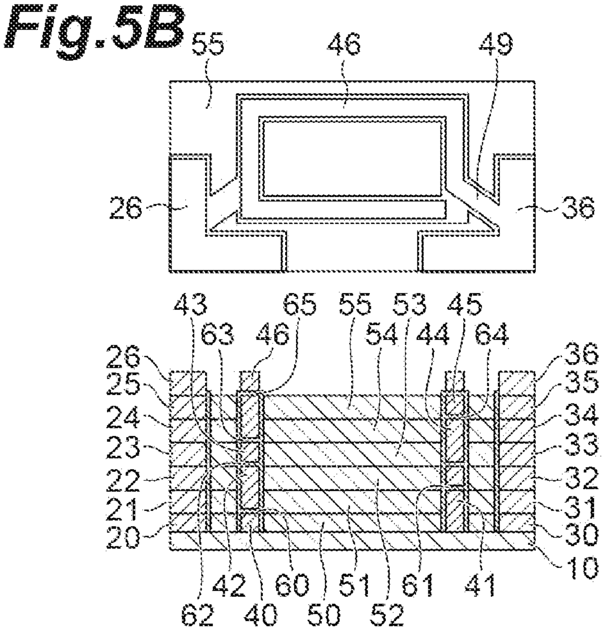

Next, the first electrode layer 26, the second electrode layer 36, the coil conductor 46, and the connecting conductor 49 are formed as illustrated in FIG. 5B. The first electrode layer 26 is formed on the first electrode layer 25. The second electrode layer 36 is formed on the second electrode layer 35. The coil conductor 46 is formed on a part of the coil conductor 45. The second electrode layer 36 and the coil conductor 46 are electrically connected by the connecting conductor 49.

Figure 5C:
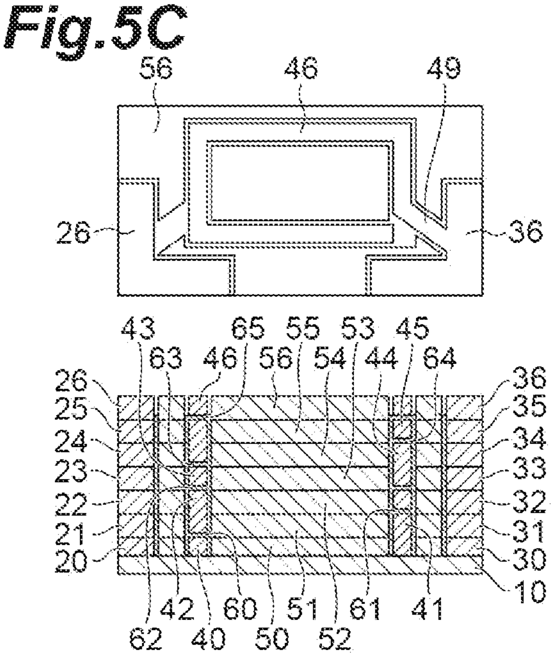
Figure 5D:
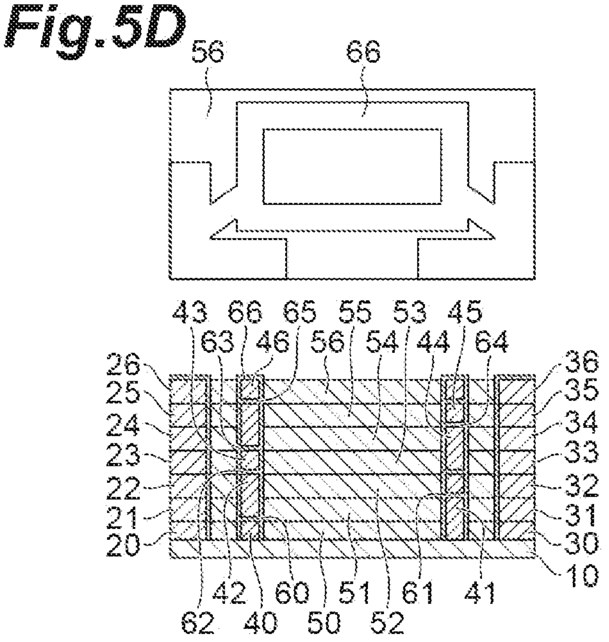

Next, the holding layer 56 is formed as illustrated in FIG. 5C. The holding layer 56 is formed on the holding layer 55. Next, the glass film 66 is formed as illustrated in FIG. 5D. The glass film 66 covers the first electrode layer 26, the second electrode layer 36, the coil conductor 46, and the connecting conductor 49.

Figure 5E:
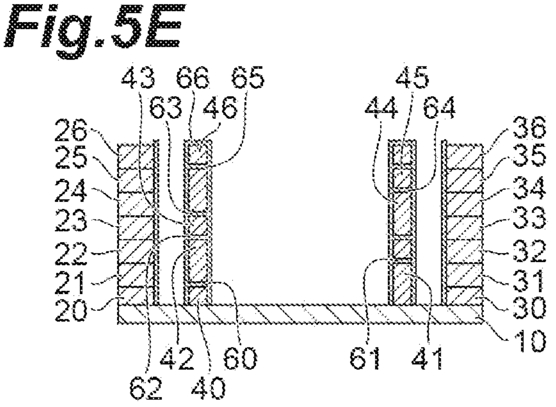

Next, the holding layers 50 to 56 are exposed by being irradiated with ultraviolet rays, developed with a developing solution, and removed as illustrated in FIG. 5E. Subsequently, heat treatment is performed on the coil conductors 40 to 46 covered with the first electrode layers 20 to 26, the second electrode layers 30 to 36, and the glass films 60 to 66. Specifically, the heat treatment is performed at a temperature of, for example, 650° C. to 950° C.

Figure 5F:
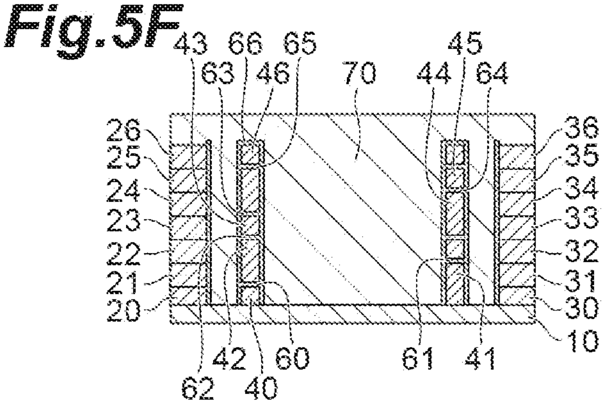

Next, the coil conductors 40 to 46 covered with the glass films 60 to 66 are filled with a magnetic material 70 as illustrated in FIG. 5F. Subsequently, heat treatment is performed on the magnetic material 70, the magnetic material is sintered, and the element body 2 is formed. The multilayer coil component 1 is obtained as a result. If necessary, a plating layer may be provided by performing electrolytic plating or electroless plating on the first terminal electrode 3 and the second terminal electrode 4 after the heat treatment.

As described above, in the method for manufacturing the multilayer coil component 1 according to the present embodiment, the holding layers 50 to 56 are formed by a positive-type photoresist, the holding layers 50 to 56 are exposed by being irradiated with ultraviolet rays and developed with a developing solution, and the holding layers 50 to 56 are removed. In this manner, the holding layers 50 to 56 can be removed without firing by the method for manufacturing the multilayer coil component 1. Accordingly, by the method for manufacturing the multilayer coil component 1, it is possible to suppress the coil conductors 40 to 46 becoming problematic in the manufacturing process due to binder removal during firing or the like. As a result, by the method for manufacturing the multilayer coil component 1, a decline in the reliability of the multilayer coil component 1 and a decline in yield can be avoided.

In addition, in the method for manufacturing the multilayer coil component 1, the coil conductors 40 to 46 are covered with the glass films 60 to 66, and thus the insulating properties of the coil conductors 40 to 46 are ensured. Accordingly, the glass films 60 to 66 can be reduced in thickness, and thus the distance between the coil conductors 40 to 46 can be reduced. In other words, layer thickness reduction is achieved between the conductors of the coil conductors 40 to 46. As a result, the multilayer coil component 1 can be reduced in size and characteristics can be improved.

In the multilayer coil component 1 according to the present embodiment, photosensitive insulating paste is photosensitive glass paste and the glass films 60 to 66 are formed as insulating films. By this method, the adjacent coil conductors 40 to 46 can be electrically insulated from each other appropriately.

In the multilayer coil component 1 according to the present embodiment, heat treatment is performed on the coil conductors 40 to 46 and the glass films 60 to 66 after the holding layers 50 to 56 are removed. Then, filling with the magnetic material 70 is performed. In this method, filling with the magnetic material 70 is performed after the coil conductors 40 to 46 and the glass films 60 to 66 are sintered by heat treatment, and thus it is possible to further suppress the coil conductors 40 to 46 becoming problematic.

Second Embodiment

Figure 6:
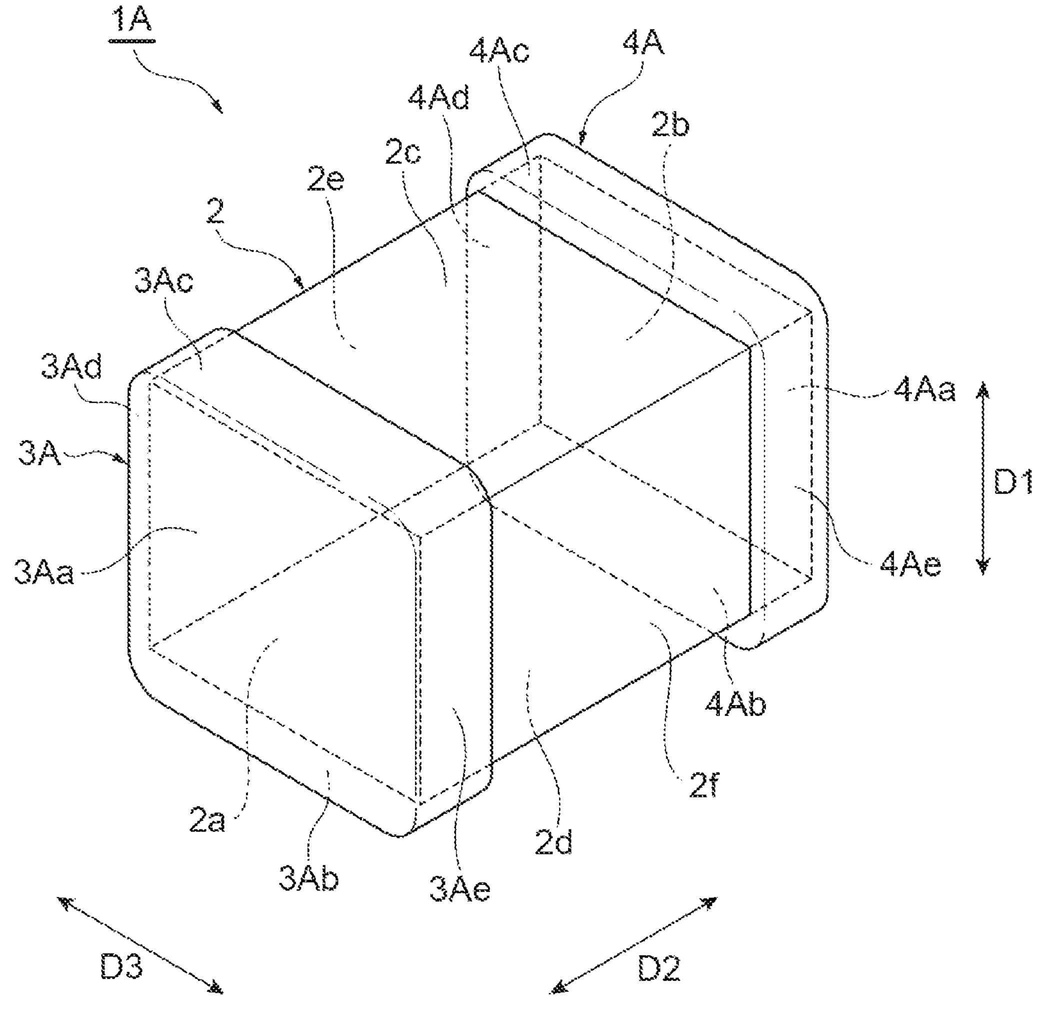
FIG. 6 is a perspective view of a multilayer coil component according to a second embodiment.
Figure 7:
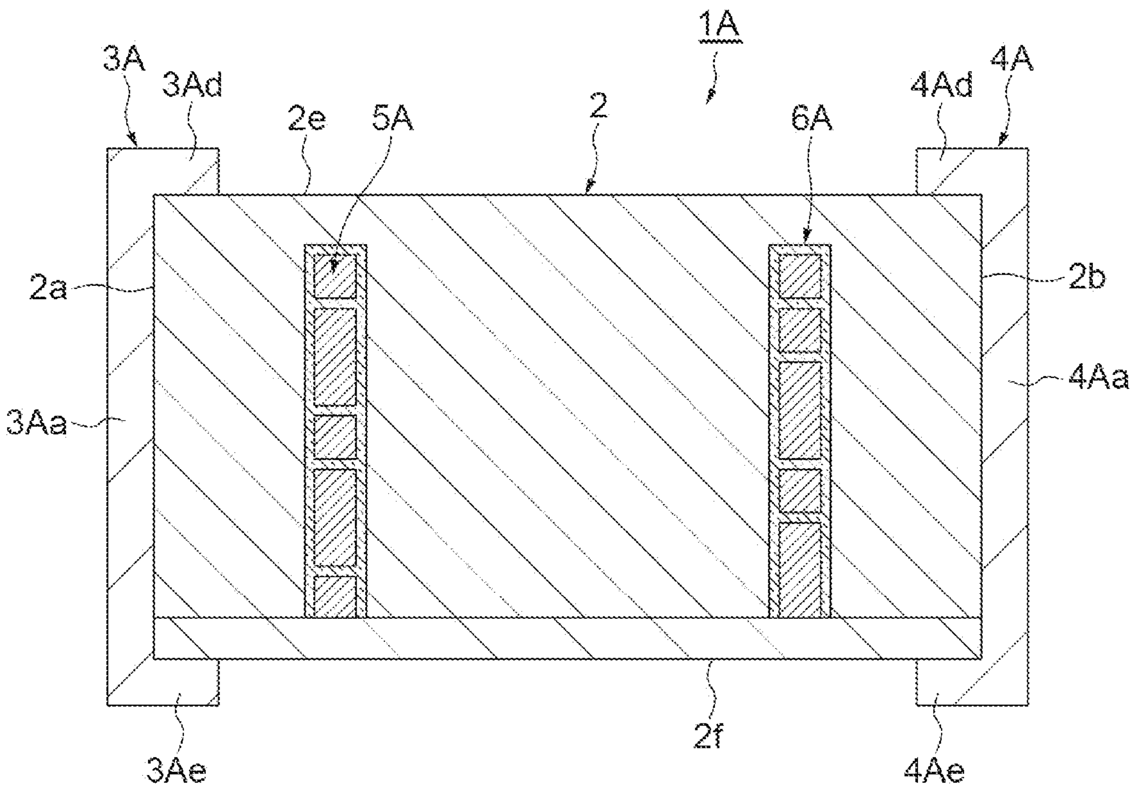
FIG. 7 is a diagram illustrating a cross-sectional configuration of the multilayer coil component illustrated in FIG. 6.

A multilayer coil component according to a second embodiment will be described below with reference to FIGS. 6 and 7. FIG. 6 is a perspective view of the multilayer coil component according to the second embodiment. FIG. 7 is a diagram illustrating a cross-sectional configuration of the multilayer coil component illustrated in FIG. 6. As illustrated in FIGS. 6 and 7, a multilayer coil component 1A includes the element body 2, a first terminal electrode 3A, a second terminal electrode 4A, a coil 5A, and a covering portion 6A.

The first terminal electrode 3A is disposed on the end surface 2*a* of the element body 2, and the second terminal electrode 4A is disposed on the end surface 2*b* of the element body 2. In other words, the first terminal electrode 3A and the second terminal electrode 4A are separated from each other in the second direction D2. The first terminal electrode 3A and the second terminal electrode 4A have a substantially rectangular shape in a plan view, and the corners of the first terminal electrode 3A and the second terminal electrode 4A are rounded. The first terminal electrode 3A and the second terminal electrode 4A contain a conductive material. The conductive material is, for example, Ag or Pd. The first terminal electrode 3A and the second terminal electrode 4A are configured as sintered bodies of conductive paste. The conductive paste contains conductive metal powder and glass frit. The conductive metal powder is, for example, Ag powder and/or Pd powder.

The first terminal electrode 3A includes five electrode parts. The first terminal electrode 3A includes an electrode part 3Aa positioned on the end surface 2*a*, an electrode part 3Ab positioned on the main surface 2*d*, an electrode part 3Ac positioned on the main surface 2*c*, an electrode part 3Ad positioned on the side surface 2*e*, and an electrode part 3Ae positioned on the side surface 2*f*. The electrode part 3Aa covers the entire surface of the end surface 2*a*. The electrode part 3Ab covers a part of the main surface 2*d*. The electrode part 3Ac covers a part of the main surface 2*c*. The electrode part 3Ad covers a part of the side surface 2*e*. The electrode part 3Ae covers a part of the side surface 2*f*. The five electrode parts 3Aa, 3Ab, 3Ac, 3Ad, and 3Ae are integrally formed.

The second terminal electrode 4A includes five electrode parts. The second terminal electrode 4A includes an electrode part 4Aa positioned on the end surface 2*b*, an electrode part 4Ab positioned on the main surface 2*d*, an electrode part 4Ac positioned on the main surface 2*c*, an electrode part 4Ad positioned on the side surface 2*e*, and an electrode part 4Ae positioned on the side surface 2*f*. The electrode part 4Aa covers the entire surface of the end surface 2*b*. The electrode part 4Ab covers a part of the main surface 2*d*. The electrode part 4Ac covers a part of the main surface 2*c*. The electrode part 4Ad covers a part of the side surface 2*e*. The electrode part 4Ae covers a part of the side surface 2*f*. The five electrode parts 4Aa, 4Ab, 4Ac, 4Ad, and 4Ae are integrally formed.

The coil 5A is disposed in the element body 2. One end of the coil 5A is connected to the first terminal electrode 3A by a connecting conductor 88. The other end of the coil 5A is connected to the second terminal electrode 4A by a connecting conductor 89. The coil 5A is configured to include a plurality of coil conductors 80, 81, 82, 83, 84, 85, and 86 (see FIG. 10E). The plurality of coil conductors 80 to 86 are interconnected to constitute the coil 5A. The coil axis of the coil 5A is provided along the first direction D1. The coil conductors 80 to 86 are disposed so as to overlap at least in part when viewed from the first direction D1. The coil conductors 80 to 86 are disposed apart from the end surfaces 2*a* and 2*b*, the main surfaces 2*c* and 2*d*, and the side surfaces 2*e* and 2*f*. The coil 5A is made of a conductive material (for example, Ag and/or Pd).

The covering portion 6A covers the coil 5A. The covering portion 6A is configured to include glass films 100, 101, 102, 103, 104, 105, and 106 (see FIG. 10E). The covering portion 6A is made of glass.

An example of a method for manufacturing the multilayer coil component 1A will be described below with reference to FIGS. 8A to 8F, 9A to 9F, and 10A to 10F. FIGS. 8A to 8F, 9A to 9F, and 10A to 10F illustrate plan and/or cross-sectional views in the manufacturing process.

Figure 8A:
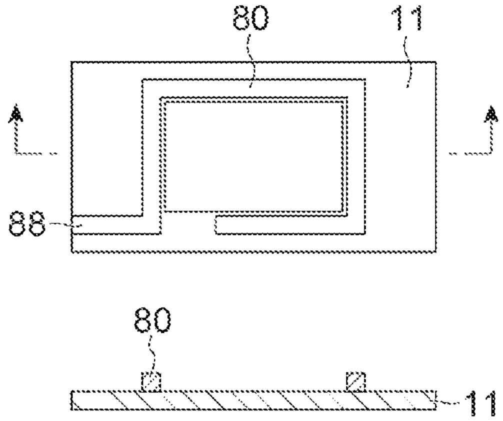
FIGS. 8A, 8B, 8C, 8D, 8E, and 8F are views illustrating a multilayer coil component manufacturing process.

As illustrated in FIG. 8A, the coil conductor 80 and the connecting conductor 88 are formed on a magnetic material substrate 11. The coil conductor 80 and the connecting conductor 88 are formed by a photolithography method. Specifically, photosensitive silver paste (photosensitive conductive paste) is applied onto the magnetic material substrate 11. Subsequently, the photosensitive silver paste is exposed by being irradiated with ultraviolet rays via a mask (such as a Cr mask) having the pattern of the coil conductor 80 and the connecting conductor 88 and developed with a developing solution. The coil conductor 80 and the connecting conductor 88 are formed as a result. The connecting conductor 48 electrically connects the coil conductor 80 and the first terminal electrode 3. The coil conductors 81 to 86 and the connecting conductor 89 are formed by the same method as the photolithography method described above.

Figure 8B:
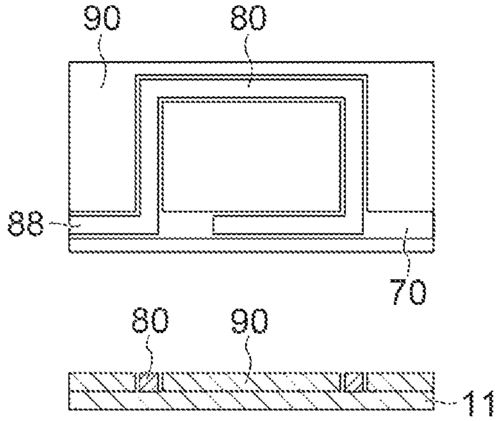

Next, a holding layer 90 is formed as illustrated in FIG. 8B. The holding layer 90 holds the coil conductor 80. The holding layer 90 is a positive-type photoresist. The holding layer 90 is formed by a photolithography method. Specifically, resin paste forming a positive-type photoresist is applied onto the magnetic material substrate 11, the coil conductor 80, and the connecting conductor 88. Subsequently, the resin paste is exposed by being irradiated with ultraviolet rays via a mask having the pattern of the coil conductor 80 and the connecting conductor 88 and developed with a developing solution. The holding layer 90 is formed as a result. The mask has a pattern wider than the coil conductor 80 and the connecting conductor 88 such that a gap is formed between the coil conductor 80 and the connecting conductor 88 and the holding layer 90. Holding layers 91 to 96 are formed by the same method as the photolithography method described above.

Figure 8C:
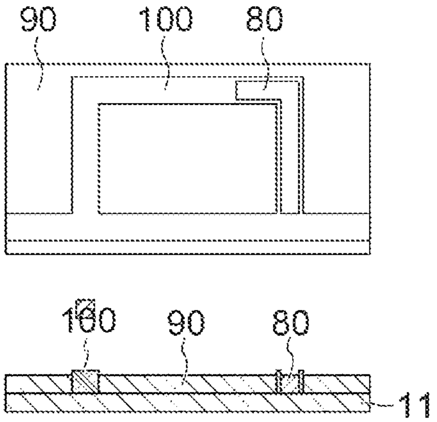

Next, the glass film 100 is formed as illustrated in FIG. 8C. The glass film 100 is formed by a photolithography method. Specifically, photosensitive glass paste is applied onto the coil conductor 80, the connecting conductor 88, and the holding layer 90. As a result, the gap between the coil conductor 80 and the connecting conductor 88 and the holding layer 90 is filled with the photosensitive glass paste. Subsequently, the photosensitive glass paste is exposed by being irradiated with ultraviolet rays via a mask exposing a part of the coil conductor 80 and developed with a developing solution. The glass film 100 is formed as a result. The glass film 100 exposes a part of the coil conductor 80. The glass film 100 covers the coil conductor 80. Specifically, the glass film 100 covers the side surface and the upper surface of the coil conductor 80 and exposes a part of the upper surface. The glass films 101 to 106 are formed by the same method as the photolithography method described above.

Figure 8D:
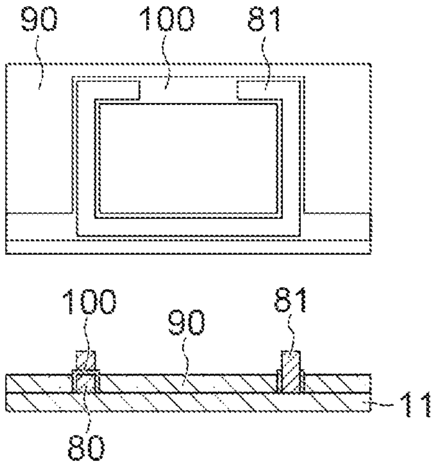
Figure 8E:
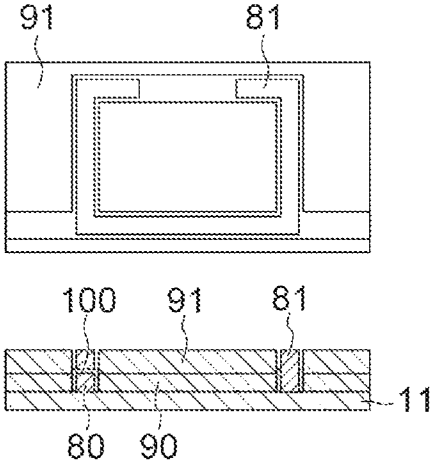
Figure 8F:
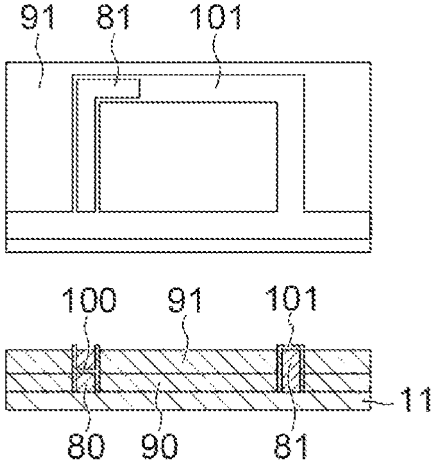

Next, the coil conductor 81 is formed as illustrated in FIG. 8D. The coil conductor 81 is formed on a part of the coil conductor 80. The coil conductor 81 is electrically connected to the coil conductor 80. Next, the holding layer 91 is formed as illustrated in FIG. 8E. The holding layer 91 is formed on the holding layer 90. Next, the glass film 101 is formed as illustrated in FIG. 8F. The glass film 101 exposes a part of the coil conductor 81.

Figure 9A:
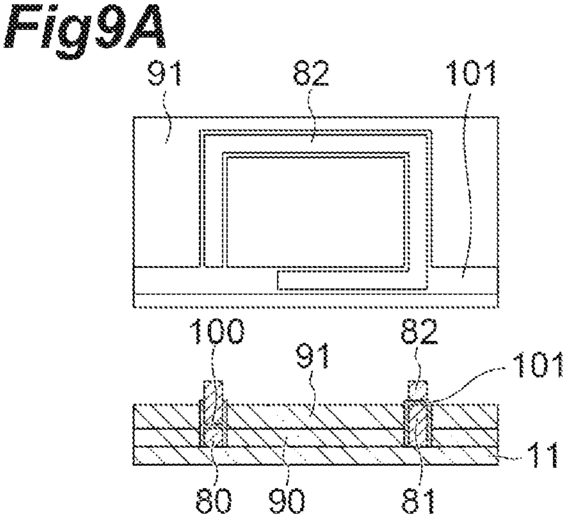
FIGS. 9A, 9B, 9C, 9D, 9E, and 9F are views illustrating the multilayer coil component manufacturing process.
Figure 9B:
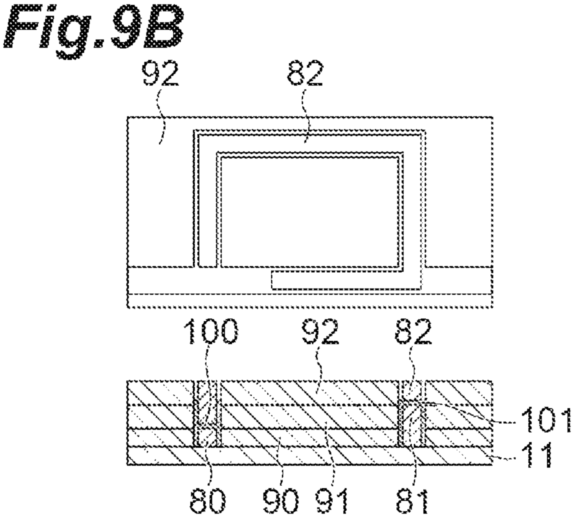
Figure 9C:
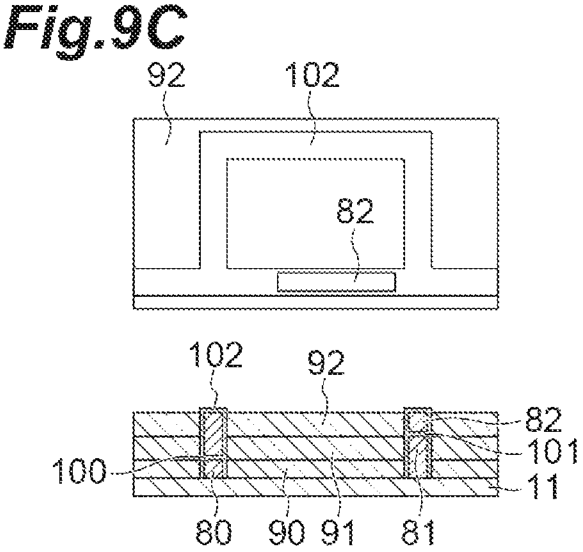

Next, the coil conductor 82 is formed as illustrated in FIG. 9A. The coil conductor 82 is formed on a part of the coil conductor 81. The coil conductor 82 is electrically connected to the coil conductor 81. Next, the holding layer 92 is formed as illustrated in FIG. 9B. The holding layer 92 is formed on the holding layer 91. Next, the glass film 102 is formed as illustrated in FIG. 9C. The glass film 102 exposes a part of the coil conductor 82.

Figure 9D:
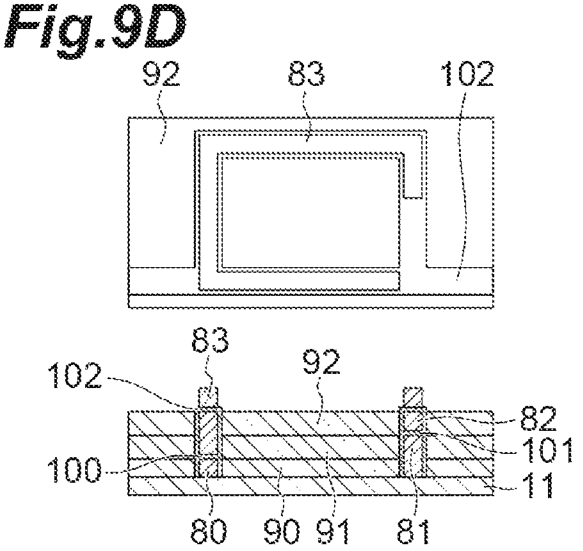
Figure 9E:
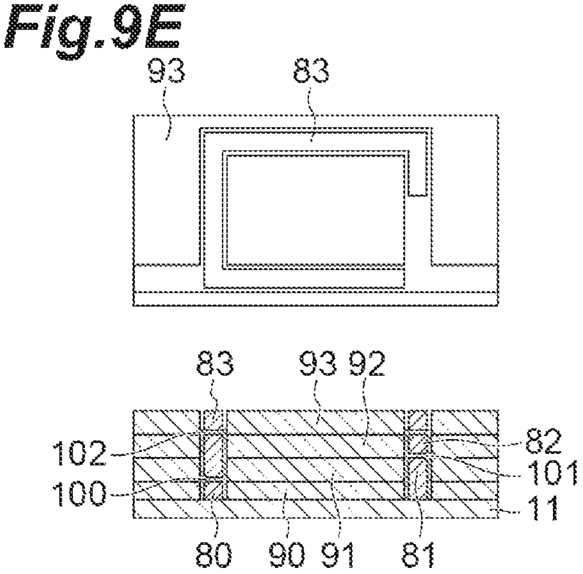
Figure 9F:
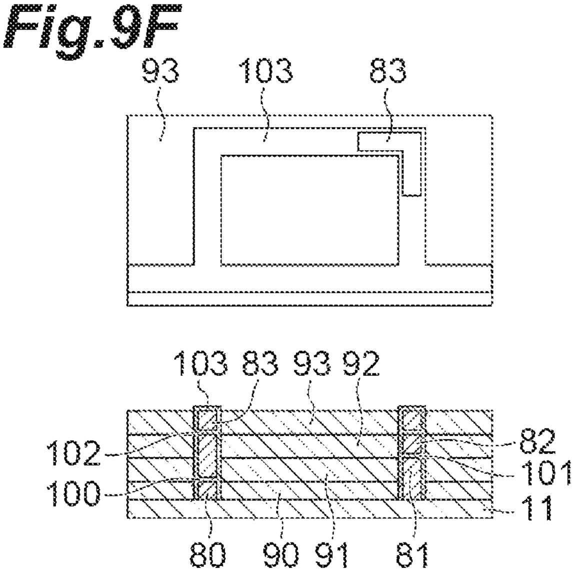

Next, the coil conductor 83 is formed as illustrated in FIG. 9D. The coil conductor 83 is formed on a part of the coil conductor 82. The coil conductor 83 is electrically connected to the coil conductor 82. Next, the holding layer 93 is formed as illustrated in FIG. 8E. The holding layer 93 is formed on the holding layer 92. Next, the glass film 103 is formed as illustrated in FIG. 8F. The glass film 103 exposes a part of the coil conductor 83.

Figure 10A:
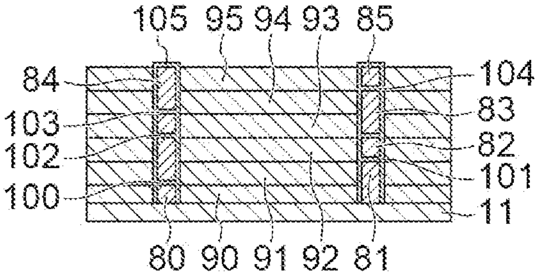
FIGS. 10A, 10B, 10C, 10D, 10E, and 10F are views illustrating the multilayer coil component manufacturing process.

Next, the coil conductor 84 and the coil conductor 85 are formed as illustrated in FIG. 10A. The coil conductor 84 is formed on a part of the coil conductor 83. The coil conductor 85 is formed on a part of the coil conductor 84. In addition, the holding layer 94 and the holding layer 95 are formed. The holding layer 94 is formed on the holding layer 93. The holding layer 95 is formed on the holding layer 94. In addition, the glass film 104 and the glass film 105 are formed. The glass film 104 is formed on the glass film 103. The glass film 105 is formed on the glass film 104.

Figure 10B:
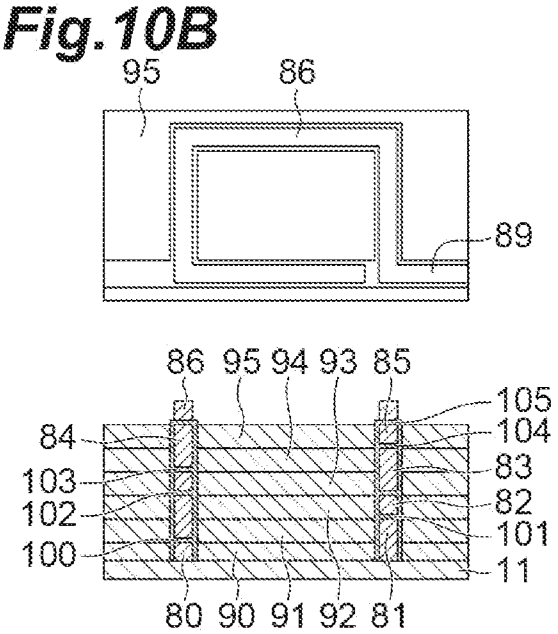

Next, the coil conductor 86 and the connecting conductor 89 are formed as illustrated in FIG. 10B. The coil conductor 86 is formed on a part of the coil conductor 85. The connecting conductor 89 electrically connects the coil conductor 86 and the second terminal electrode 4.

Figure 10C:
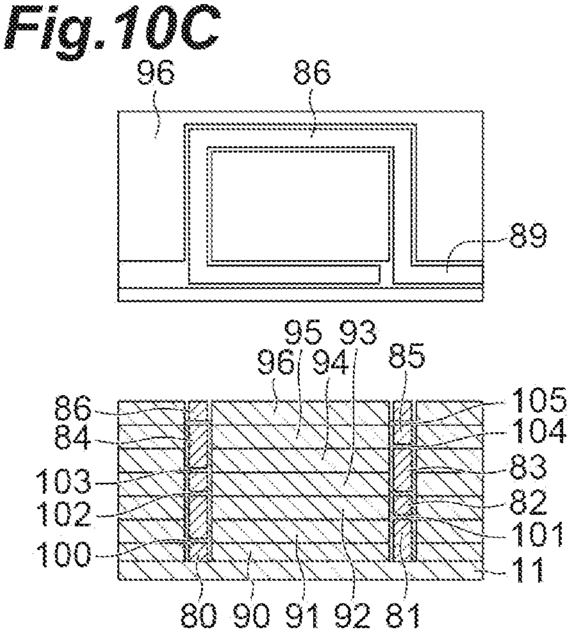
Figure 10D:
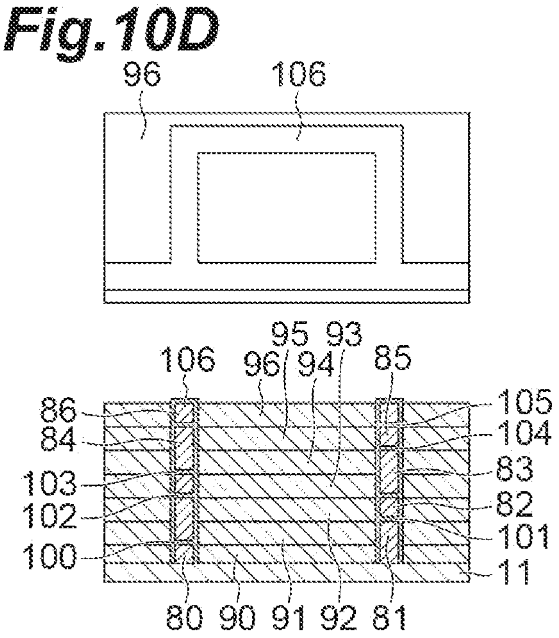

Next, the holding layer 96 is formed as illustrated in FIG. 10C. The holding layer 96 is formed on the holding layer 95. Next, the glass film 106 is formed as illustrated in FIG. 10D. The glass film 106 covers the coil conductor 86.

Figure 10E:
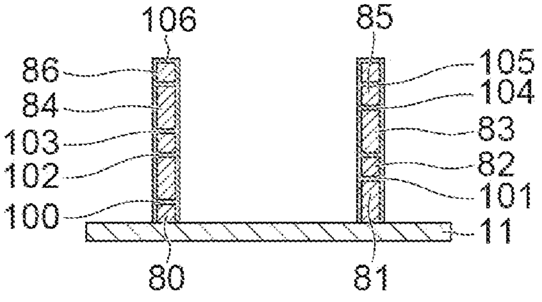

Next, the holding layers 90 to 96 are exposed by being irradiated with ultraviolet rays, developed with a developing solution, and removed as illustrated in FIG. 10E. Subsequently, heat treatment is performed on the coil conductors 80 to 86 covered with the glass films 100 to 106. Specifically, the heat treatment is performed at a temperature of, for example, 650° C. to 950° C.

Figure 10F:
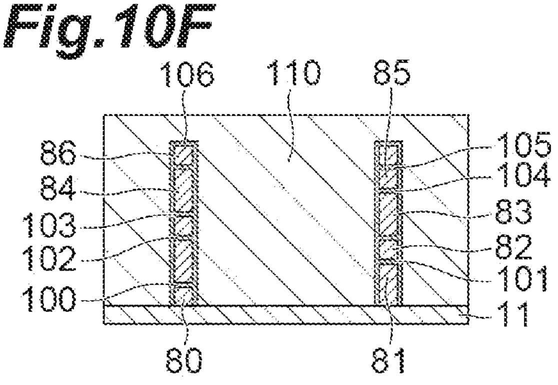

Next, the coil conductors 80 to 86 covered with the glass films 100 to 106 are filled with a magnetic material 110 as illustrated in FIG. 10F. Subsequently, heat treatment is performed on the magnetic material 110, the magnetic material is sintered, and the element body 2 is formed. Next, the first terminal electrode 3A and the second terminal electrode 4A are formed. The first terminal electrode 3A and the second terminal electrode 4A are formed by conductive paste application and firing. The multilayer coil component 1A is obtained as a result. If necessary, a plating layer may be provided by performing electrolytic plating or electroless plating on the first terminal electrode 3A and the second terminal electrode 4A after the heat treatment.

As described above, in the method for manufacturing the multilayer coil component 1A according to the present embodiment, the holding layers 90 to 96 are formed by a positive-type photoresist, the holding layers 90 to 96 are exposed by being irradiated with ultraviolet rays and developed with a developing solution, and the holding layers 90 to 96 are removed. In this manner, the holding layers 90 to 96 can be removed without firing by the method for manufacturing the multilayer coil component 1A. Accordingly, by the method for manufacturing the multilayer coil component 1A, it is possible to suppress the coil conductors 80 to 86 becoming problematic in the manufacturing process due to binder removal during firing or the like. As a result, by the method for manufacturing the multilayer coil component 1A, a decline in the reliability of the multilayer coil component 1A and a decline in yield can be avoided.

The present invention is not necessarily limited to the embodiments of the present invention described above. Various modifications can be made within the gist thereof.

In the above embodiments, a form in which photosensitive glass paste is used as photosensitive insulating paste has been described as an example. However, the photosensitive insulating paste may contain another material.

In the above embodiments, a form in which heat treatment is performed on the coil conductors 40 to 46, 80 to 86 and the glass films 60 to 66, 100 to 106 after the holding layers 50 to 56, 90 to 96 are removed and filling with the magnetic material 70, 110 is performed after the heat treatment has been described as an example. Alternatively, heat treatment may be performed after filling with the magnetic material 70, 110 is performed with the holding layers 50 to 56, 90 to 96 removed.

In the above embodiments, a form in which heat treatment is performed after filling with the magnetic material 70, 110 is performed has been described as an example. However, heat treatment may not be performed in a case where the magnetic material 70, 110 is a metal magnetic material or the like.

In the above embodiments, a form in which the coil 5, 5A has the coil conductors 40 to 46, 80 to 86 has been described as an example. However, the number of coil conductors is not limited to the above value.

What is claimed is:

1. A method for manufacturing a multilayer coil component including an element body and a coil disposed in the element body and configured to include a plurality of conductors, the method comprising:

forming at least one conductor of the plurality of the conductors by a photolithography method using photosensitive conductive paste;

forming an insulating film covering the at least one conductor by a photolithography method using photosensitive insulating paste;

forming a resin layer holding the at least one conductor covered with the insulating film by a positive-type photoresist;

after forming the at least one conductor and the insulating film, irradiating the resin layer with ultraviolet rays and developing the resin layer to remove the resin layer; and filling the at least one conductor covered with the insulating film with a magnetic material after removing the resin layer.

2. The method for manufacturing a multilayer coil component according to claim 1, wherein the photosensitive insulating paste is photosensitive glass paste and a glass film is formed as the insulating film.

3. The method for manufacturing a multilayer coil component according to claim 1, further comprising performing heat treatment on the at least one conductor and the insulating film covering the at least one conductor after removing the resin layer.

4. The method for manufacturing a multilayer coil component according to claim 1, further comprising performing heat treatment after the filling with the magnetic material.

* * * * *